United States Patent [19]

Mahnke

[11] Patent Number: 4,614,988
[45] Date of Patent: Sep. 30, 1986

[54] DISC DRIVE CLUTCH ACTUATION SYSTEM

[75] Inventor: Paul H. Mahnke, Westminster, Calif.

[73] Assignee: Weltec Digital, Inc., Anaheim, Calif.

[21] Appl. No.: 553,458

[22] Filed: Nov. 21, 1983

[51] Int. Cl.⁴ ............... G11B 5/012; G11B 5/016; G11B 33/02

[52] U.S. Cl. ............................ 360/97; 360/99; 369/77.1

[58] Field of Search ........... 360/97, 99, 86, 133; 369/261, 270, 77.1

[56] References Cited

U.S. PATENT DOCUMENTS

| | | | |
|---|---|---|---|
| 3,488,059 | 1/1970 | Bellini et al. | 369/77.1 |
| 3,899,794 | 8/1975 | Brown | 360/133 |
| 4,139,876 | 2/1979 | Owens | 360/97 |
| 4,142,730 | 3/1979 | Hynd et al. | 274/9 B |
| 4,193,102 | 3/1980 | Beuch et al. | 360/105 |
| 4,216,510 | 8/1980 | Manzke et al. | 360/99 |
| 4,272,794 | 6/1981 | Skarky | 360/97 |
| 4,274,119 | 6/1981 | Hayward | 360/97 |
| 4,380,783 | 4/1983 | Adamek et al. | 360/99 |
| 4,413,294 | 11/1983 | Beijer | 360/99 |

FOREIGN PATENT DOCUMENTS 0091098 10/1983 European Pat. Off. ............ 360/99

Primary Examiner—Stuart N. Hecker
Assistant Examiner—Benjamin E. Urcia
Attorney, Agent, or Firm—Finnegan, Henderson, Farabow, Garrett & Dunner

[57] ABSTRACT

A clutch actuation system for a magnetic diskette drive includes a two-part mechanism with a door driven pawl, pawl spring and clutch load spring all arranged generally co-planarly with a clutch lever in a limited vertically disposed mechanism compartment; such two-part mechanism being operated upon access door movement to provide combined functions of a door stop, door open return and spring loading of the clutch in its disc drive position.

4 Claims, 7 Drawing Figures

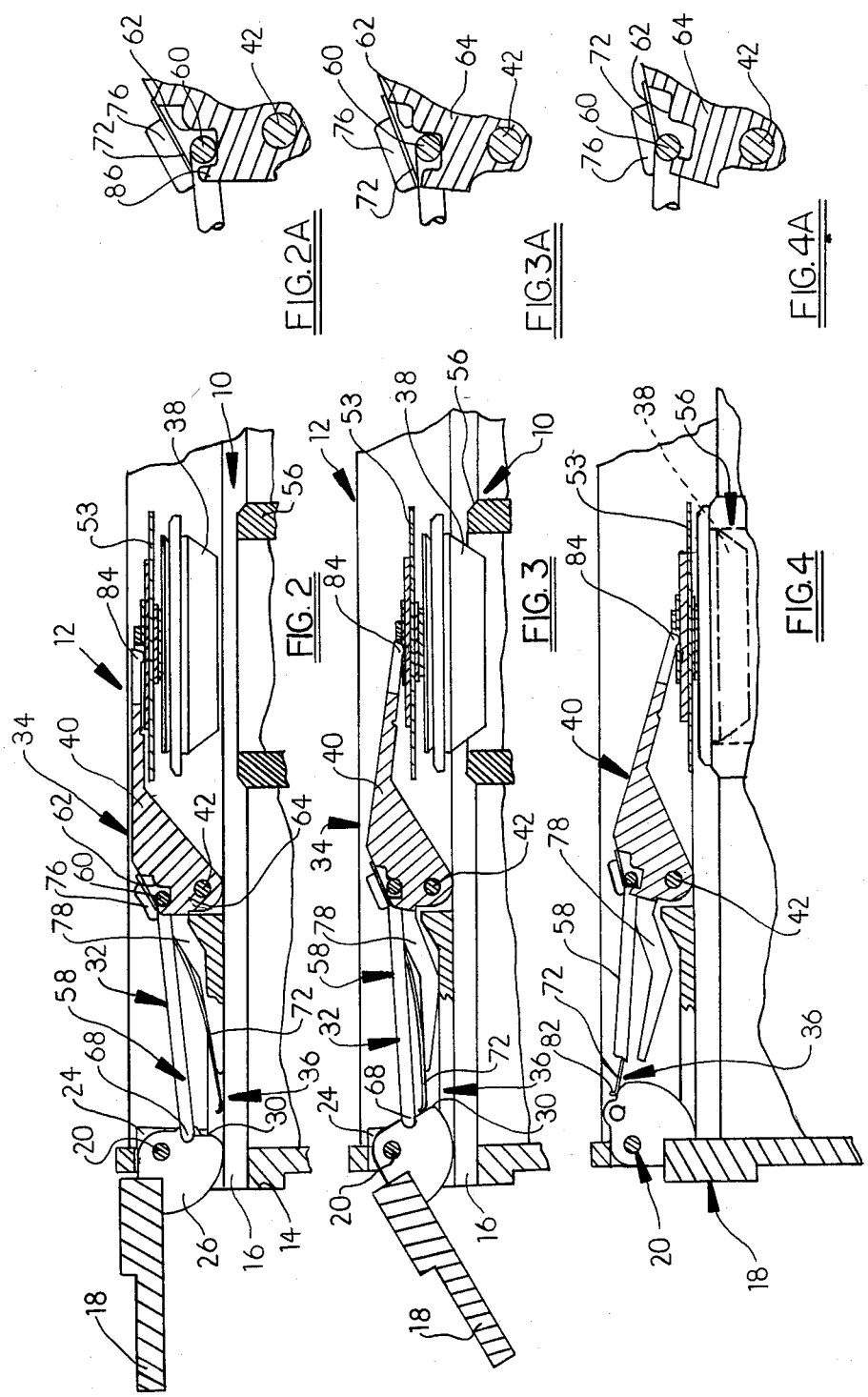

DISC DRIVE CLUTCH ACTUATION SYSTEM

TECHNICAL FIELD

This invention relates to clutch actuation systems for floppy magnetic disc drive units and more particularly to such systems that are operated in response to movement of an access door.

BACKGROUND ART

Various drive apparatus for magnetic discs have included various linkages between an access door on disc drive enclosure and disc clamping and drive components. One such arrangement, disclosed in U.S. Pat. No. 4,216,510, includes a linkage having a lever biasing spring with a constant spring force on both door closure and opening. U.S. Pat. No. 4,142,730 discloses a floppy disc drive having space extensive, spring biased, bar actuated releasable hooks to hold the disc cartridge in a drive position.

DISCLOSURE OF THE INVENTION

An object of the present invention is to provide an improved clutch actuation system for a floppy magnetic diskette including linkage components located losely within a vertically restrictive height requirement within the disc drive enclosure.

Another object of the present invention is to provide the improved clutch actuation system set forth in the aforesaid object wherein the system includes a low mechanical advantage linkage system that provides combined functions of door open stop, door return to full open and low load clutch lever operation during such operations and a high mechanical advantage linkage system that holds the clutch in its engaged position when the door is closed.

Yet another object of the present invention is to provide a clutch actuation system as set forth in the preceding object wherein the low mechanical advantage linkage includes a U-shaped pawl with its bight portion slidable in a clutch lever slot and with its legs coupled to a door-mounted crank to pull the clutch into a raised, disengaged position when the door is opened and wherein pawl spring means pull the door to its open position; and wherein the high mechanical advantage linkage includes a cam surface on the door that acts on a clutch load spring to force it against the clutch lever to hold the clutch in its actuated drive position when the door is latched closed.

The clutch actuation system specifically includes an access door pivotally mounted on the front fascia of a disc drive unit enclosure. The magnetic diskette is inserted through an access slot when the door is opened to be positioned with respect to a movable clutch hub that is selectively raised into and out of engagement with a drive motor hub. The door is hinged and movable against low spring forces of a low mechanical advantage linkage including a pawl member when the door is moved from its closed position to an intermediate ready position, then to a full open stop position. The door includes a high mechanical advantage cam on the door that positions a clutch load spring to impose a loading force through a clutch lever when the clutch is positioned in its disc drive position on door closure. The cam, pawl member and spring are arranged in a generally co-planar disposition to occupy a reduced vertical space in the disc drive enclosure.

These and other objects, features and advantages of the present invention are readily apparent from the following description of the invention when taken in conjunction with the accompanying drawings.

BRIEF DESCRIPTION OF THE DRAWINGS

FIGS. 2 through 4 are fragmentary, broken-away side views of the disc drive unit showing door open, mid-open and door closed positions, respectively, with a clutch lever shown sectioned along its longitudinal centerline; and FIGS. 2A and 4A are enlarged sectional views of a slotted end of the clutch lever in each of the views of FIGS. 2 through 4, respectively.

BEST MODE FOR CARRYING OUT THE INVENTION

Figure 1:
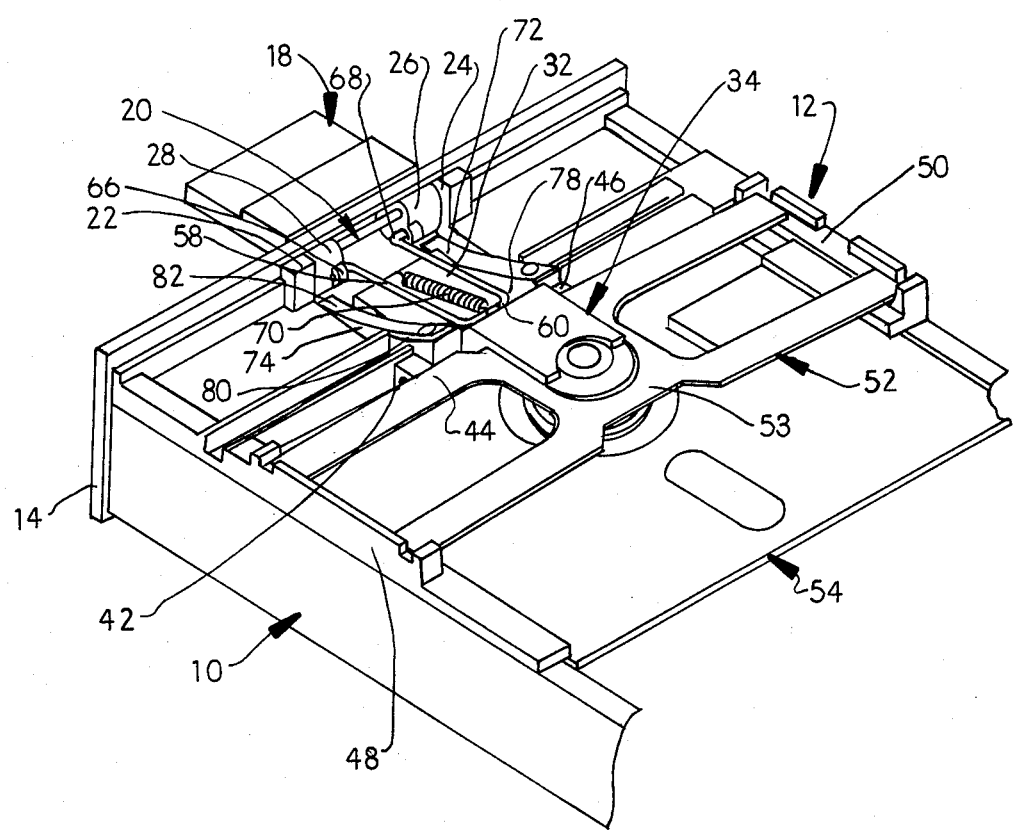
FIG. 1 is a perspective view of a magnetic disc drive unit with its enclosure broken away to show the clutch actuation system of the present invention.

FIGS. 1 and 2 show a main frame 10 of a floppy disc drive unit 12. A front bezel 14 is connected to one end of the main frame. It includes an access slot 16 for inserting and removing a floppy diskette of magnetizable material.

The access slot 16 is partially covered by an access door 18 supported by a pivot pin 20 to spaced, bearing segments 22, 24 on the front bezel 14.

The access door 18 includes a pair of spaced enlarged end portions 26, 28 each having a cam surface 30 thereon for purposes to be discussed.

The end portions 26, 28 are associated with a first low mechanial advantage linkage 32 of a clutch actuator system 34 and with a high mechanical advantage linkage 36 of the system 34.

In accordance with the present invention, the linkages 32, 36 are configured to be located in a reduced vertical space above the main frame 10 so that the outer vertical dimensions of the disc drive unit can be held within desired space restraints. Moreover, the linkages define an open door stop and a door open return function, and permit a limited perpendicular movement of a clutch 38 as controlled by a clutch lever 40 mounted by a pivot pin 42 to spaced bearing points 44, 46 on the main frame 10.

Side supports 48, 50 on the main frame carry ends of an H-shaped flexure spring 52 which has its center bar 53 connected to clutch 38. When the spring 52 is relaxed, it holds the clutch 38 in a disengaged position shown in FIG. 1 with access door fully opened so that diskette 54 is free to slide into its illustrated loaded position.

The diskette 54 is centered and clamped when the clutch 38 is moved by the lever 40 to an engaged position with a drive motor hub 56. The hub 56 is operated to drive the clamped diskette in a known manner with respect to read/write heads driven by known carriage drive means, not shown, to simplify the drawings and to better illustrate the present invention.

The low mechanical advantage linkage 32 includes a U-shaped pawl 58 with a bight segment 60 positioned in a slot 62 in the pivotally connected end 64 of clutch lever 40. Spaced legs 66, 68 of pawl 58 are bent outwardly to connect to a point on each end portion 26, 28 offset below the pivot pin to define a drive crank for shifting the pawl in accordance with door movement. A pawl spring 70 connects bight segment 60 and the main frame to hold the bight portion within the slot 62 during clutch actuation.

The high mechanical advantage linkage 36 includes cam surfaces 30 and a pair of spaced load springs 72, 74 each respectively connected by a rivet 76 to spaced, inclined surfaces 78, 80 on the upper face of clutch lever 40 as best seen in FIG. 1. Each spring 72, 74 has a bent free end 82 that will selectively engage or release from a cam surface 30 to separate the operation of the high and low mechanial advantage linkages 32, 34. The clutch actuation system operation is as follows:

When the door 18 is rotated closed about pivot pin 20, the pawl 58 initially engages the clutch lever 40 as shown in FIG. 3. This first stage of closure actuation causes the end 84 of lever 40 to engage center bar 53 to overcome relatively light force of the H-shaped flexure spring 52 to move the clutch 38 to a ready position in the hub. At the same time, the cam surfaces 30 pick up the bent ends of load springs 72, 74 (also shown in FIG. 3).

As the door 18 continues to close, the pawl 58 pulls away from the clutch lever 40 as shown in FIG. 4 and the high mechanical advantage linkage 34 produces a second stage clutch actuation (from the ready position). The profiles of cams 30 act on the load springs 72, 74 to impose a high mechanical advantage diskette engagement load on the clutch 38 as the clutch lever 40 depresses flexure spring 52 to force the clutch 38 into its engaged position in the motor hub 56 so as to capture the diskette. When the door is closed fully (and latched by suitable means) the springs 72, 74 are deflected to impose a substantial spring loading force through the clutch lever 40 to the clutch 38.

To disengage the clutch 38 the door 18 is unlatched and the load springs 72, 74 relax to cause the door to move toward the open position. The H-shaped flexure spring 52 continues to open the door through the clutch lever 40 while at the same time raising the clutch 38 to its disengaged position.

In accordance with the present invention, the flexure spring 52, clutch lever 40, load springs 72, 74, pawl 58 and pawl spring 70 are arranged generally co-planarly so that as these components are raised vertically they do so in about the same vertical space restraint. Such movement causes the pawl spring 70 to be positioned to pull the door 18 to its full open position. The bight segment engages a stop surface 86 on lever 40 to limit door travel at the door full open position.

Thus, in summary, the low mechanical advantage components including the door crank, the pawl and the clutch level combine to (1) provide a stop for the door in the open position; (2) include a low spring force action by pawl spring 70 to return the door to the full open position and provide for rotation of the clutch lever 40 (both opening and closing) during low load travel; and (3) be functionally combined with the cam profile and high load springs to provide a second stage actuation for positive clutch engagement, with engagement, ready and disengagement positioning of the clutch being accomplished in a minimum amount of vertical space.

While the invention has been particularly shown and described with respect to a preferred embodiment thereof, it will be understood by those skilled in the art that various changes in form and detail may be made without departing from the spirit and scope of the invention.

What is claimed is:

1. In a floppy disc drive apparatus having a front fascia with an access slot to selectively permit insertion of a disk through the slot for positioning on a main frame between a selectively engageable, vertically moveable clutch and a motor hub, a clutch actuation system comprising:
   an access door associated with said access slot and having an enlarged end portion, said access door including pin means for pivotally supporting said end portion at a pivot axis on the front fascia to allow the door to move between open and closed positions on either side of a mid-open door position;
   a pawl connected to said enlarged end at a pivot point offset from the pivot axis of said pin means for pulling and pushing said pawl in a generally horizontal plane;
   a clutch lever mechanically coupled to said clutch and having a pivoted end connected to the main frame on an axis below the pivot axis of said door and below said pawl offset pivot point;
   slot means coupled to said pawl and said clutch lever for causing said pawl to rotate said clutch lever and position the clutch between a vertically raised open position when the door is in its open position, in which an upper surface of the clutch lever is at a first inclination, and a ready position, when the door is in its mid-point position, in which the pawl pushes the clutch lever so that its upper surface is slightly inclined with respect to said first inclination;
   a clutch load spring mechanically coupled to said clutch; and
   a cam profile on said enlarged end portion that engages said clutch load spring to cause it to bias the clutch into a disk-engaging drive position when the door has moved from its mid-point position toward its closed position.

2. The system of claim 1, wherein
said door is located in the center of the front fascia and the enlarged end portions of said door include spaced side portions, each of said side portions including a stepped cam profile;
wherein said clutch load spring includes a pair of spring strips with bent ends; and
said system further includes
inclined spring support surfaces on opposite sides of said clutch lever at the pivoted end thereof,
means for fixing one end of each of said spring strips to one of said spring support surfaces, and
means for supporting said bent ends of each of said strips on the main frame in an unloaded state to engage said stepped cam profile and to flex the spring strips for causing said clutch lever to bias the clutch into disk-engaging position when the door is in its closed position.

3. A magnetic disk drive apparatus having a main frame, an access door through which magnetic disks may be inserted, a motor drive hub and a clutch which is engageable with said motor drive hub, said drive apparatus comprising:
   a clutch lever mechanically coupled to said clutch and having a pivoted end connected to said main frame, said clutch lever causing said clutch to engage and disengage with said motor drive hub;
   low mechanical advantage linkage means coupled to said clutch lever;

high mechanical advantage linkage means including a clutch load spring;

cam profile drive means mechanically coupled to an end of said access door and to said low and high mechanical advantage linkage means such that when said access door moves from a fully opened position to a mid-open position, said cam profile drive means is coupled to said low mechanial advantage linkage means to cause said clutch lever to impose a first spring force on said clutch, and when said door moves to a closed position, said cam profile is mechanically coupled to said clutch load spring of said high mechanical advantage linkage means to impose a second spring force on said clutch to maintain it in an engaged position with said motor drive hub, said second spring force being greater than said first spring force; and a flat flexure spring coupled to said main frame on a side of said clutch opposite to said motor drive hub, said flat flexure spring having a center segment for applying a third spring force on said clutch when disengaged from said motor drive hub and for applying an opening force to said door.

4. The drive apparatus in claim 3 wherein said spring is H-shaped.

* * * * *